United States Patent
Karlsson et al.

(10) Patent No.: US 12,415,411 B2
(45) Date of Patent: Sep. 16, 2025

(54) STRUCTURAL BATTERY FOR AN ELECTRIC VEHICLE AND METHOD OF MANUFACTURING

(71) Applicant: Volvo Car Corporation, Gothenburg (SE)

(72) Inventors: Daniel Karlsson, Daniel Island, SC (US); Martin Hjälm Wallborg, Harestad (SE)

(73) Assignee: Volvo Car Corporation, Gothenburg (SE)

( * ) Notice: Subject to any disclaimer, the term of this patent is extended or adjusted under 35 U.S.C. 154(b) by 316 days.

(21) Appl. No.: 17/942,231

(22) Filed: Sep. 12, 2022

(65) Prior Publication Data
US 2023/0108456 A1 Apr. 6, 2023

(51) Int. Cl.
| | |
|---|---|
| *B60K 1/04* | (2019.01) |
| *B60L 50/60* | (2019.01) |
| *B62D 25/02* | (2006.01) |
| *H01M 50/209* | (2021.01) |
| *H01M 50/249* | (2021.01) |

(52) U.S. Cl.
CPC ............... *B60K 1/04* (2013.01); *B60L 50/66* (2019.02); *B62D 25/025* (2013.01); *H01M 50/209* (2021.01); *H01M 50/249* (2021.01); *B60K 2001/0438* (2013.01); *H01M 2220/20* (2013.01)

(58) Field of Classification Search
CPC .............. B60K 1/04; B60K 2001/0438; B60K 2001/0405; B60L 50/66; B60L 50/64; B62D 25/025; H01M 50/209; H01M 50/249; H01M 2220/20; H01M 50/242; H01M 50/289; H01M 50/291; H01M 50/103; H01M 10/625; Y02E 60/10
See application file for complete search history.

(56) References Cited

U.S. PATENT DOCUMENTS

| | | | |
|---|---|---|---|
| 8,835,033 B2* | 9/2014 | Choi | ........... B29C 65/002 206/703 |
| 9,033,085 B1* | 5/2015 | Rawlinson | ........... B60K 1/04 180/68.5 |

(Continued)

FOREIGN PATENT DOCUMENTS

| | | | | |
|---|---|---|---|---|
| DE | 102017217887 A1 | | 4/2019 | |
| DE | 102018128975 A1 * | | 5/2020 | ........... B60L 3/0007 |

(Continued)

OTHER PUBLICATIONS

JP-2017196961-A (Year: 2024).*
Apr. 8, 2022 European Search Report issued in corresponding International Application No. 21200763.

*Primary Examiner* — James A Shriver, II
*Assistant Examiner* — Ian Bryce Shelton
(74) *Attorney, Agent, or Firm* — Clements Bernard Walker; Christopher L. Bernard

(57) ABSTRACT

A battery pack for use in an electric vehicle, includes two longitudinal sill members extending in a length direction L, interconnected at a front side by a transverse front piece and at a distance from the front piece by a transverse member. Two or more rows of battery cells are placed side by side between the sill members. The front piece and the transverse member exert a compressive force of between 20 and 200 $kN/m^2$ on the cells in the length direction.

12 Claims, 6 Drawing Sheets

(56) References Cited

U.S. PATENT DOCUMENTS

| | | | |
|---|---|---|---|
| 10,486,746 B2 * | 11/2019 | Kawabe | B60K 1/04 |
| 10,700,318 B2 * | 6/2020 | Yoshimura | H01M 50/24 |
| 11,211,656 B2 * | 12/2021 | Matecki | H01M 50/271 |
| 2013/0252059 A1 * | 9/2013 | Choi | H01M 50/24 |
| | | | 156/60 |
| 2018/0375075 A1 * | 12/2018 | Yoshimura | H01M 50/227 |
| 2021/0194041 A1 * | 6/2021 | Park | H01M 50/333 |
| 2022/0037726 A1 * | 2/2022 | Choi | H01M 10/6556 |
| 2022/0111910 A1 * | 4/2022 | Hirota | B62D 27/026 |
| 2022/0166101 A1 * | 5/2022 | Gyulai | H01M 50/249 |
| 2022/0314771 A1 * | 10/2022 | Toda | B62D 25/20 |
| 2023/0026549 A1 * | 1/2023 | Ijaz | H01M 10/647 |
| 2023/0094304 A1 * | 3/2023 | Inami | B62D 21/11 |
| | | | 180/65.1 |
| 2023/0101843 A1 * | 3/2023 | Inami | B60K 1/04 |
| | | | 296/193.07 |
| 2023/0103246 A1 * | 3/2023 | Inami | B62D 25/2018 |
| | | | 296/204 |
| 2023/0123420 A1 * | 4/2023 | Pucher | H01M 50/264 |
| | | | 429/163 |
| 2023/0163393 A1 * | 5/2023 | Andersson | H01M 10/486 |
| | | | 429/99 |
| 2023/0268587 A1 * | 8/2023 | Thurmeier | H01M 10/6564 |
| 2023/0307769 A1 * | 9/2023 | Maguire | H01M 50/291 |
| 2024/0063499 A1 * | 2/2024 | Wroblewski | H01M 10/48 |
| 2024/0145838 A1 * | 5/2024 | Bockman | H01M 10/653 |

FOREIGN PATENT DOCUMENTS

| | | | | |
|---|---|---|---|---|
| EP | 3392923 A1 * | 10/2018 | | H01M 2/02 |
| JP | 2017196961 A * | 11/2017 | | |
| WO | WO-2020143178 A1 * | 7/2020 | | B60K 1/04 |

* cited by examiner

STRUCTURAL BATTERY FOR AN ELECTRIC VEHICLE AND METHOD OF MANUFACTURING

CROSS-REFERENCE TO RELATED APPLICATION

The present disclosure claims the benefit of priority of co-pending European Patent Application No. 21200763.7, filed on Oct. 4, 2021, and entitled "Structural Battery for an Electric Vehicle and Method of Manufacturing," the contents of which are incorporated in full by reference herein.

TECHNICAL FIELD

The present disclosure relates to a battery pack for use in an electric vehicle, having two longitudinal sill members extending in a length direction, interconnected at a front side by a transverse front piece and at a distance from the front piece by a transverse member, the front piece and the transverse member extending in a width direction, a number of rectangular battery cells being placed between the sill members, the front piece and the transverse member, the cells being mutually adjacent in the length direction. The present disclosure also relates to an electric vehicle including such a battery pack and to a method of manufacturing.

BACKGROUND

Electrical vehicles (also known as Battery Electric Vehicle, BEV in short) use a battery pack to provide electricity to the drive train/motor(s) that is most often located centrally underneath a body-in-white structure. Until recently, a battery pack has been seen as a standalone unit with main function of being a protective cage around battery cells and modules preventing intrusion in case of an accident, while protecting sensitive electronics inside from the outside environment. Going further into the battery pack design, battery cells and modules have been treated as sub-systems, carrying their own separate mechanical structures such as module end plates and straps. However, there are opportunities for improvement if the ingoing parts are integrated to form larger units, functioning as one system. From a bottom-up-approach, cells integrated to form a strong pack with high volumetric efficiency; a battery pack used as a structural component and leveraged as such when installed to a body-in-white. Such a design is able to remove redundant structures, increase cell volume and reduce complete vehicle weight, all while improving on range, crashworthiness and driver experience by providing a lighter, nimbler vehicle due to a lowered polar moment of inertia, as the cells are packed closer to vehicle center of gravity.

Current art is compensating lower volumetric efficiency and level of integration by using a larger cell footprint (or simply choosing lower pack energy due to wheelbase limitations). It is the aim of the present development to improve on volumetric efficiency by using the strategy laid out up top. Cells integrated to pack, and pack integrated to body-in-white. In doing so, a reduced cell footprint is aimed at, creating and allowing a more deformable structure and stopping distance in between cells and the vehicle outer dimensions.

A shorter stopping distance has two effects down the road. Energy absorption is a function of stopping distance and force generated by the structure in between as it collapses. Given the energy function described above, increasing the allowed stopping distance between the car body (also known as "Body in White" or BiW) and cell, makes down-gauging of the structures possible; saving weight, lowering cost, reducing the environmental impact.

It is known to provide structural batteries in which the battery casing forms the bottom of the vehicle body and the traditional front floor is removed. The arrays of battery cells are kept in place inside the casing of the battery pack by means of a resin poured in the interspaces between the battery cells.

It is the intention of the application to build a pack around battery cells (wherein the cells are considered as foundational building blocks) in extension providing a structural battery pack capable of replacing a traditional body-in-white center floor structure, all while improving pack volumetric efficiency. The inherent pack structural strength will be leveraged on complete vehicle level in front and side-impact load cases. As the volumetric efficiency is improved, the pack and cell footprint can be made more narrow, beneficial in side impact as a longer stopping distance opens more options to balance range, weight and crashworthiness. Finally, the stronger pack design is leveraged to deliver and improve on important driver dynamics attributes as noise, vibrations and harshness (NVH) and handling. Cells packed closer to vehicle center of gravity will reduce the polar moment of inertia, making the vehicle nimbler and more responsive.

It is another object of the application to provide an efficient method of manufacturing a battery pack for use in electric vehicles and assembling the battery pack to the frame parts of the electric vehicle.

SUMMARY

A battery pack for use in an electric vehicle according to the disclosure includes two longitudinal sill members extending in a length direction L, interconnected at a front side by a transverse front piece and at a distance from the front piece by a transverse member, the front piece and the transverse member extending in a width direction W, a number of rectangular battery cells being placed between the sill members, the front piece and the transverse member, the cells being mutually adjacent in the length direction L, the front piece and the transverse member exerting a compressive force of between 20 and 200 kN/m2 on the cells in the length direction, two or more rows of battery cells being placed side by side in the width direction W.

The battery pack according to the disclosure has reduced weight and improved volumetric efficiency by compressing the cells that are mutually adjacent, forming a stack between the front and rear transverse beams, without further internal support components between the cells. This allows removing one layer of structure (BiW) in the electric vehicle and letting the battery become a structural part of the BiW, once installed in the vehicle. The improved volumetric efficiency that is achieved by the battery pack according to the disclosure can be used to make the pack more narrow and in extension save weight by creating a longer stopping distance.

The prismatic battery cells require a pre-compressive force at beginning of life (BOL) when installed to either a module or cell-to-pack solution. This is due to their rectangular format. The front piece and the transverse member interconnect the sill members and serve the dual purpose of being compressive end plates while providing a mechanical interface for integrating the pack to the electric vehicle.

An embodiment of a battery pack includes compression members situated between battery cells that are adjacent in the length direction L. The compression members may be included between each pair of adjacent battery cells in the length direction or can be placed between only some adjacent cells and maintain a resilient compression on the cells in the length direction. The compression members may include a rubber frame with an aerogel compound inside the frame. The rubber is compressible and suitable for reaching an initial compressive force. The aerogel acts as a thermal barrier, preventing thermal runaway. Alternatively, the compression members include a polymer foam pad or frame. Another option for a compression member is a fibrous material pad.

The longitudinal sides of the outer battery cells may be situated close to the longitudinal sill members or may be abutting against the sill members to provide a structural support to the sill members in the width direction. In the latter case, the cells are used as a back-up structure. Alternatively, there may be a distance between the cells and the sill members in the width direction of between 5 cm and 25 cm, depending on the side impact principle used. A gap would translate into not using cells as back-up structure. In such a case, the external battery structure is allowed to collapse inwards to a specific point where a side pole is stopped before there is severe cell intrusion. The main load is carried by a body-in-white-section (i.e. rockers and rocker reinforcements) together with lateral cross members on top of the battery, and some portion in the battery sill member itself. The latter design, featuring a battery-internal air gap, allows for routing depending on the specific need; for example, an internal cooling system could be accommodated.

In an embodiment, the front piece includes a transverse part having a height substantially corresponding with the height of the battery cells, and a shelf part extending in the length direction, away from the cells, in an upper plane at or near an upper plane defined by the top sides of the battery cells.

The front piece and transverse part provide a compressive force on the battery cells while providing a stiff connection of the battery pack to the front and rear sub frames of the electric vehicle via the shelf parts.

The transverse member may in one embodiment include two transverse beams interconnected by a bottom plate, at a distance from the rear end of the sill members, defining a foot accommodation space, a rear transverse beam extending at a rear end of the sill members. This construction is especially suited for making a sedan with very low foot positions.

Alternatively, the transverse member may include a rear transverse beam that is situated at a rear end of the sill members.

In an embodiment, the front piece and/or rear transverse beam have a thickness extending in the length direction and have an inward side contacting the battery cells and an outward side facing away from the battery cells, one or more passages with electrical conductors extending through the front piece and/or rear transverse beam, from the inward side to the outward side.

The rear end beam may allow pass-through of bus bars, sensing lines and other low voltage applications. Since the end pieces are in contact with the battery cells for exerting a compressive force, the space on the battery cell side for routing of power lines and data lines is effectively closed off. By integrating a multi pass-through into the front and/or rear end piece, the power and signal lines can be effectively accommodated.

The battery pack according to the present disclosure may be formed by:
- forming two or more rows of rectangular battery cells, mutually abutting in a length direction,
- contacting the front and rear cells with transverse members extending in a width direction W, and exerting a compressive force on the transverse members of between 20 and 200 kN/m2, and
- interconnecting the transverse members by two substantially parallel sill members, extending in the length direction by attaching end sections of the sill members to the transverse members while maintaining the compressive force.

The battery cells can be stacked together, for instance complete with compression members or swell pads in between the cells. The cells are clamped between the front and rear transverse pieces at the required pre-compression, after which the end sections of the sills are welded to the transverse pieces.

A foot accommodation member or a transverse beam of compressible material (scaling member) extending in the width direction W, may be placed between a forward and a rearward group of cells and may be compressed together with the stack of cells between the front and rear transverse members, prior to attaching of the sill members.

The foot accommodation member, or foot garage, and/or the transverse beam are separate parts of the cell stacking process. When the entire stack of battery cells is compressed between the front and rear transverse members, the sill members are loaded and if needed the foot garage member can be welded to sill members for meeting predetermined structural requirements.

The transverse beam of compressible material forms a "scaling member" that can be applied for instance for the battery pack on a high SUV. There, the transverse beam can form a "stack filler" to remove cell stack void, and brings the cell stack into contact with the front and rear beams. The filler is required due to wheelbase scalability. There is no common cell format that will completely fill a pack on several different wheelbases, with and without foot garage, and with different number of cells to reach different levels of energy (e.g. using 144, 168 or 192 cells). As such, a scaling member is needed to fill up unwanted pack void.

BRIEF DESCRIPTION OF THE DRAWINGS

Some embodiments of a structural battery and method of manufacture will, by way of non-limiting example, be explained in detail with reference to the accompanying drawings. In the drawings.

DESCRIPTION OF EMBODIMENTS

Figure 1:
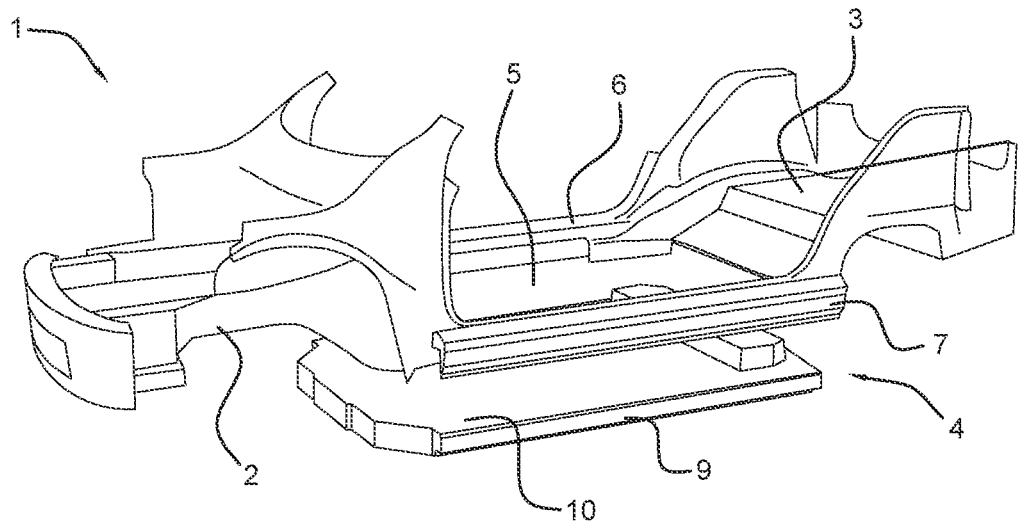
FIG. 1 shows a structural battery assembly according to the disclosure connected to a front and rear frame part of an electric vehicle.

FIG. 1 shows a frame 1 of an electric vehicle, including a front frame structure 2, a rear frame structure 3, including a rear floor, and a structural battery assembly 4 forming a bottom structure 5 of the vehicle. The structural battery assembly, or pack, 4 includes longitudinal sill profiles 6,7 that interconnect the front and rear frame structures 2,3 and that support a number of rows of interconnected battery cells 9. The top plate 10 of the battery pack 4 forms the bottom of the cabin of the vehicle.

Figure 2:
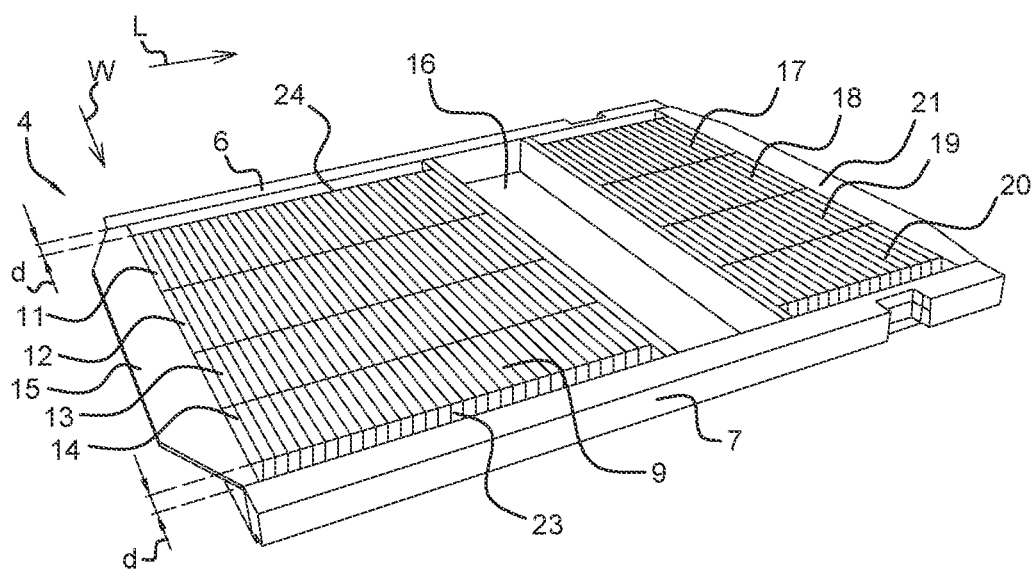
FIG. 2 shows a perspective view of a structural battery assembly with a foot garage.

FIG. 2 shows the stack of battery cells 9 that in the front part of the battery pack 4 are arranged in four rows 11,12, 13,14. The battery cells 9 are stacked in the length direction L between a front transverse beam 15 and a foot garage 16. The front transverse beam 15, the rear transverse beam 21 and the foot garage 16 are welded to the sill profiles 6,7.

In the rear part of the battery pack 4, rows of cells 17,18,19,20 are placed between the foot garage 16 and a rear transverse beam 21. The cells 9 in each row 11-14 and rows 17-20 are mutually adjacent and may include swell pads between the cells. The rows of cells 11-14 are compressed in the length direction L between front transverse beam 15 and the foot garage 16. The rows of cells 17-20 are compressed between the foot garage and the rear transverse beam 21. The compression members are formed of a resilient material. The pre-compression on the cells in the length direction L may be between 20-200 kN/m2.

Along the longitudinal sides 23, 24 of the cells 9 and the sill profiles 6,7 a distance d of between 5-25 cm may be present in the width direction W to increase the stopping distance from the cells upon side impact, which allows a weight reduction of the cells 9.

Figure 3:
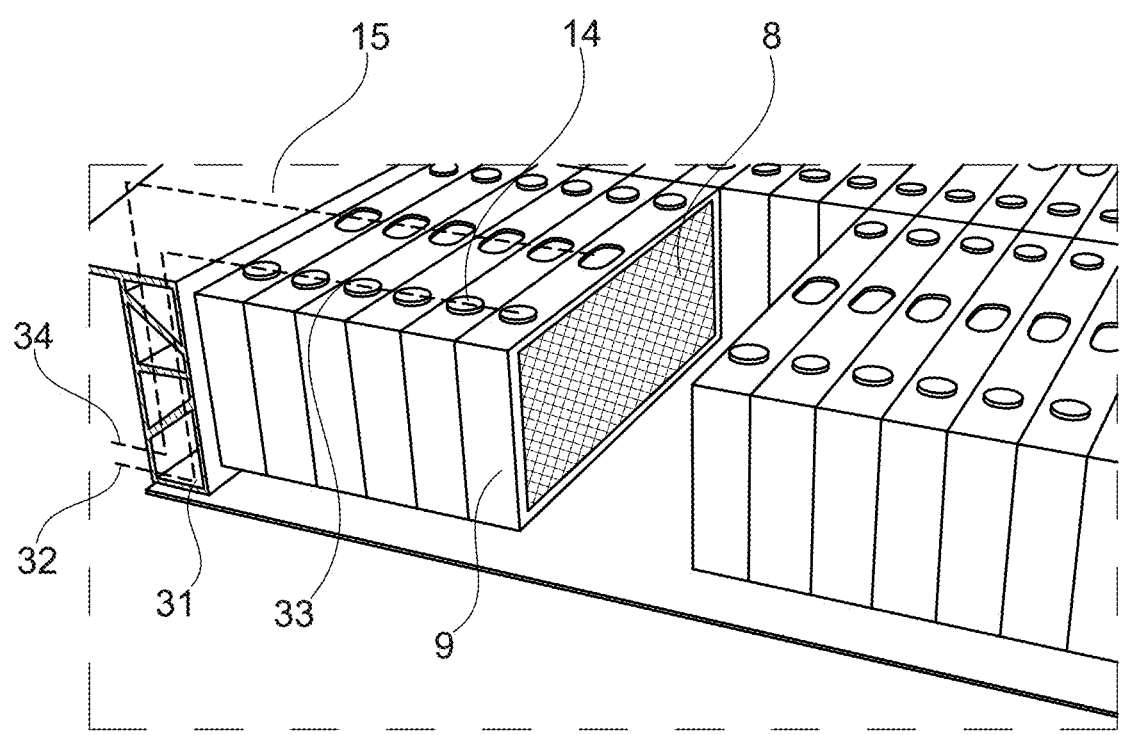
FIG. 3 shows a frame-shaped swell pad positioned on the side surfaces of the battery cells.

FIG. 3 shows a resilient compression member 8 placed on the side surface of battery cell 9. The compression member is formed of a rectangular frame of a resilient material, such as a rubber rod or tube. An aerogel compound with fire retardant properties may be included within the rubber tube.

Figure 4:
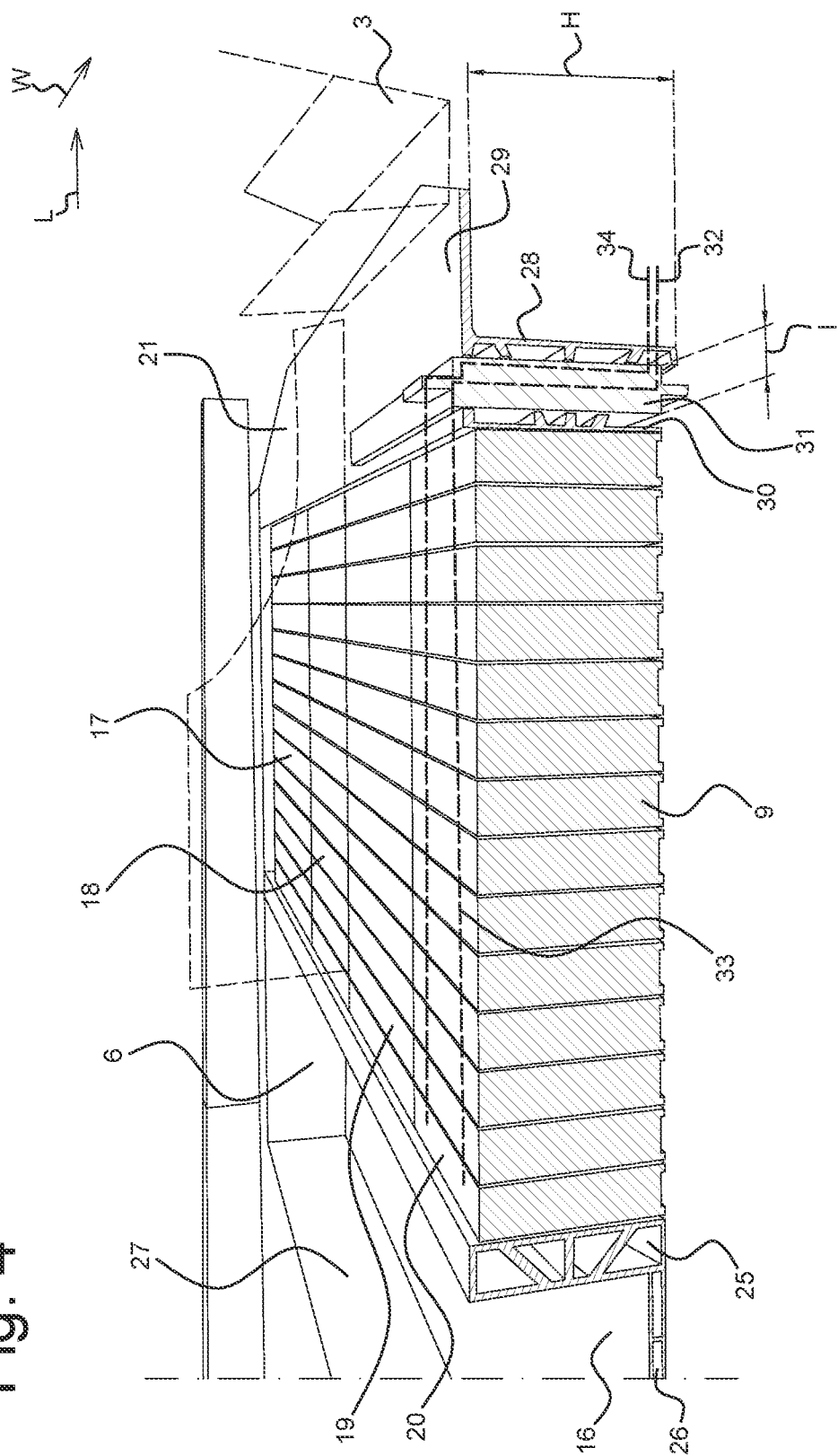
FIG. 4 shows a longitudinal cross-sectional view of a rear part of the structural battery assembly with a pass through for electrical conductors.

FIG. 4 shows the rows 17-18 of battery cells 9 that are compressed in the length direction L between on the one hand a transverse beam 25 and a bottom plate 26 of the foot garage 16 and on the other hand the rear transverse beam 21. The foot garage 16 is defined by two spaced apart transverse beams 25,27 that are interconnected via the bottom plate 26. The rear transverse beam 21 has a height H substantially corresponding to the height of the battery cells 9 and has an outer wall 28 and a horizontally extending shelf part 29 for connection to the rear frame section 3. At a distance 1 from the outer wall 28, a parallel inner wall 30 is in compressive contact with the rear face of the battery cells 9. A passthrough 31 is formed between the inner wall 30 and outer wall 28 of the beam 21 containing a high voltage conductor 32 that is attached to a bus bar 33 of the battery cells 9 and one or more signal lines 34 carrying low voltage control signals.

Figure 5:
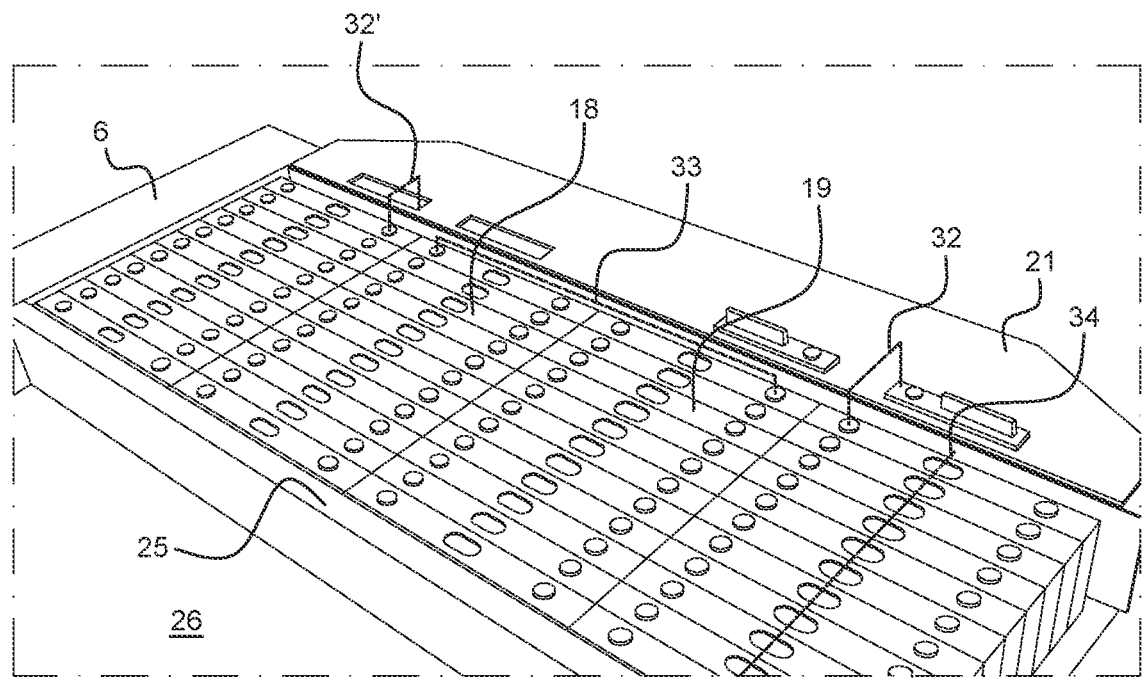
FIG. 5 shows a perspective view of the rear part of FIG. 4.

FIG. 5 schematically shows bus bar 33 forming a series interconnection of the cells in adjacent rows of battery cells 18 and 19. The high voltage conductors 32, 32' connected on the one hand to the anodes and the cathodes of the battery cells respectively, and are passed through rear transverse beam 21.

Figure 6:
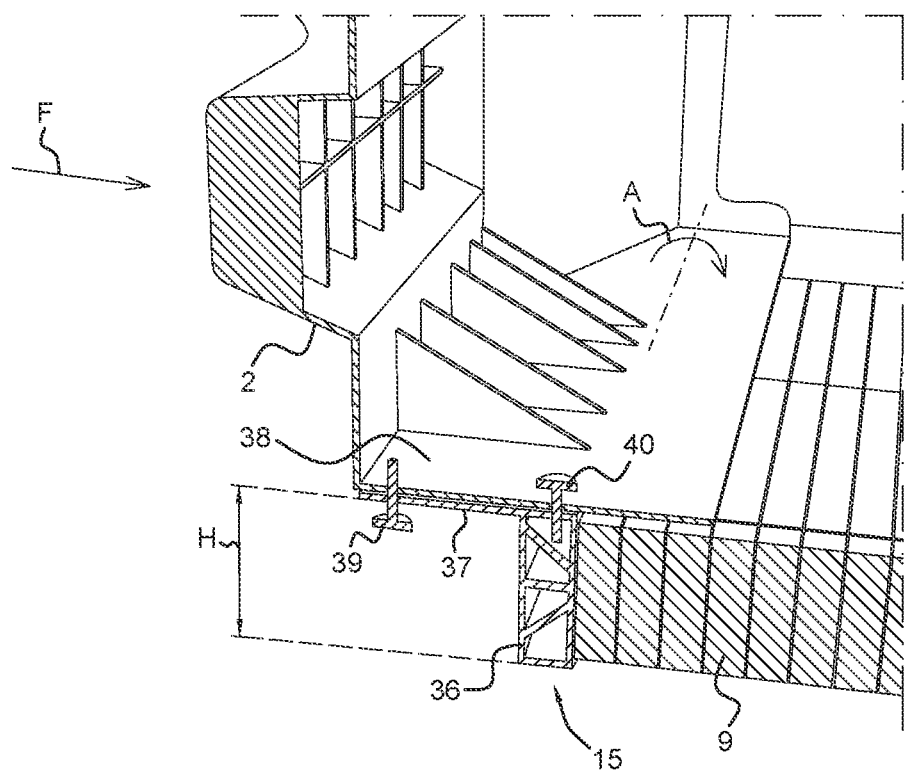
FIG. 6 shows a longitudinal cross-sectional view of a front part of the structural battery assembly and its connection to a front frame part, FIG. 7 schematically shows a first embodiment of a method of manufacturing a structural battery assembly according to the disclosure, FIG. 8 schematically shows another embodiment of a method of manufacturing a structural battery assembly according to the disclosure.

FIG. 6 shows the front transverse beam 15 with a transverse beam part 36 and a shelf part 37. The shelf part 37 connects to a plate 38 of the front frame structure 2 via bolts 39, 40. The plate 38 extends in the length direction L over the battery cells 9 to provide an increased torsional stiffness in the direction of the arrow A upon exertion of a force F generated by a frontal impact.

Figure 7:
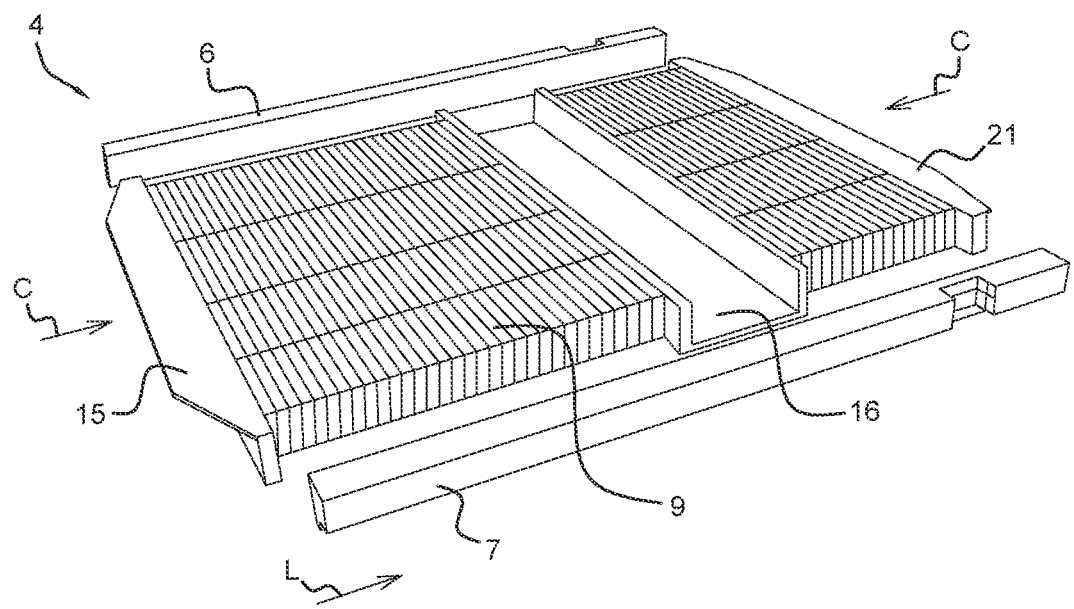

FIG. 7 schematically shows a preferred method of manufacturing a battery pack 4 according to the present disclosure by compressing the stack of battery cells 9 and foot garage member 16 between the front and rear transverse beams 15, 21 and exerting a compressive force C on the front and rear beams 15, 21. In the compressed state, the front and rear transverse beams 15, 21 are welded to the end sections of the sill profiles 6,7.

Figure 8:
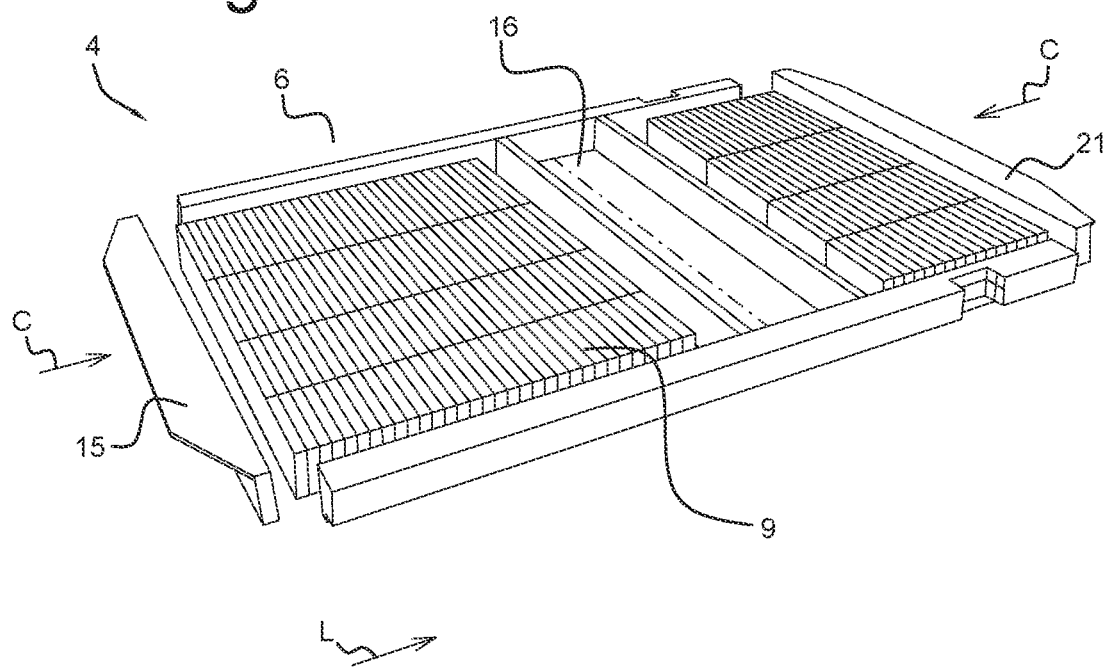

FIG. 8 schematically shows an alternative method of manufacturing a battery pack 4 according to the present disclosure, by forming an H-profile by welding the foot garage 16 to the sill profiles 6,7. Subsequently, the rows of battery cells 9 are placed in the H-shaped front and rear spaces between the sill profiles 6,7 and the foot garage 16 and the front and rear transverse beams 15 and 21 are pressed together in the longitudinal direction L, until the transverse beams 15, 21 are situated opposite the end sections of the sill members 6,7 to which they are connected by welding.

Figure 9:
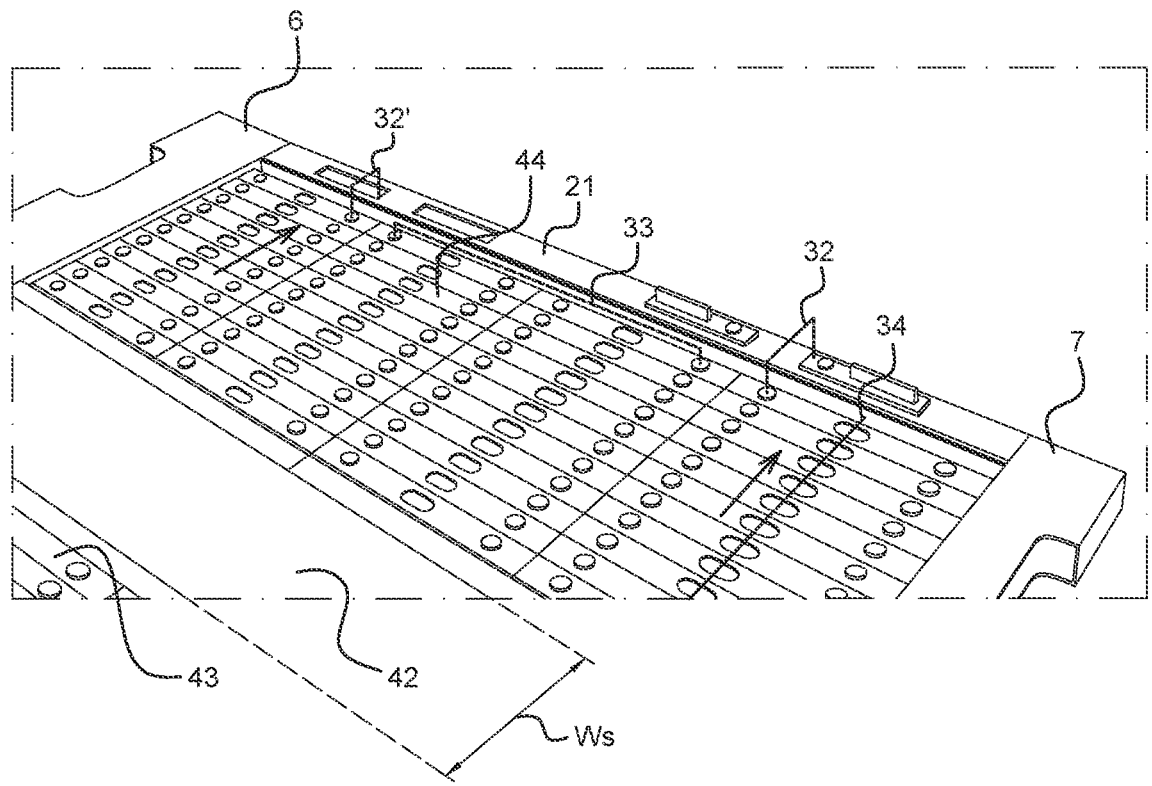
FIG. 9 shows a perspective view of an embodiment of a structural battery assembly including a resilient scaling member.

FIG. 9 shows a scaling member 42 included in the compressed stack between a forward group of battery cells 43 and a rearward group of battery cells 44. The scaling member 42 is adjusted in width Ws (seen in the length direction L) depending on the wheel base of the vehicle. The scaling member 42 acts as a "filler" to remove cell stack void, and have the battery cells 42,43 engage in compressive contact with the front and rear beams 15,21. The scaling member 42 allows the use of a fixed battery cell format to completely fill a battery pack on several different wheelbases, with and without the presence of foot garage, and with different numbers of battery cells to reach different levels of energy (e.g. 144, 168 and 192 of cells).

Figure 10:
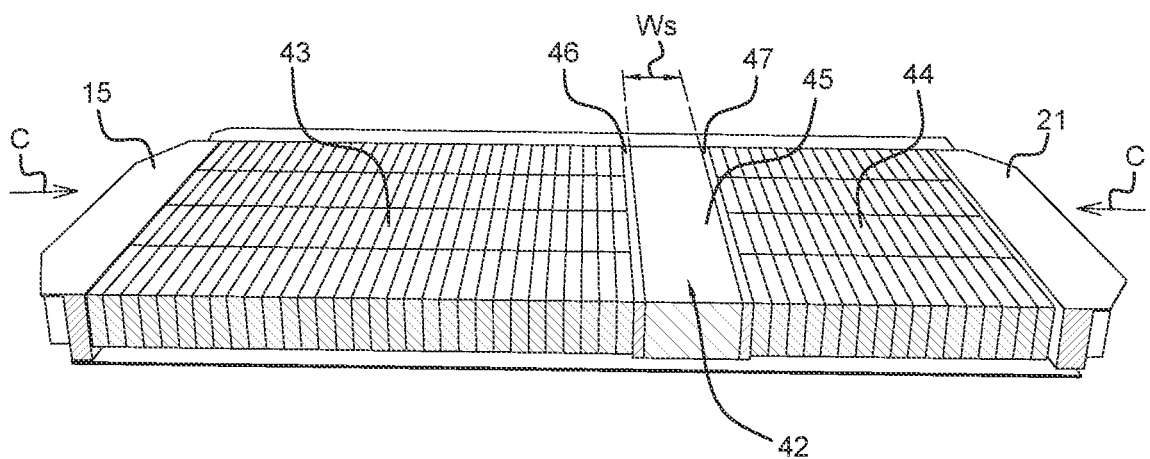
FIG. 10 shows a side view of the battery assembly of FIG. 9 with one sill member removed.

FIG. 10 shows the scaling member 42 formed of a central beam 45 of EPP, (expanded polypropylene), or EPP foam, flanked by two aluminum profiles 46, 47.

The invention claimed is:

1. A battery pack for use in an electric vehicle, the battery pack comprising:

two longitudinal sill members extending in a length direction L, interconnected at a front side by a transverse front piece and at a distance from the transverse front piece by a transverse member, the transverse front piece and the transverse member extending in a width direction W, a number of rectangular battery cells being placed between the sill members, the transverse front piece and the transverse member, the cells being mutually adjacent in the length direction L, the transverse front piece and the transverse member exerting a compressive force of between 20 and 200 kN/m2 on the cells in the length direction, two or more rows of battery cells being placed side by side in the width direction W, wherein the transverse front piece comprises a transverse part having a height H substantially corresponding with the height of the battery cells, and a shelf part extending in the length direction L, away from the cells, in an upper plane at or near an upper plane defined by the top sides of the battery cells, wherein a front frame part is connected to the shelf part via a plate that is superposed on the shelf part and extending beyond the shelf part in the length direction L over the battery cells, and wherein the battery pack is a structural part of a body of the electric vehicle.

2. The battery pack according to claim 1, further comprising compression members situated between battery cells that are adjacent in the length direction L.

3. The battery pack according to claim 1, a distance (d) between the cells and the sill members in the width direction W being between 5 cm and 25 cm.

4. The battery pack according to claim 1, wherein the transverse member comprises two transverse beams interconnected by a bottom plate, at a distance from the rear end of the sill members, defining a foot accommodation space, a rear transverse beam extending at a rear end of the sill members.

5. The battery pack according to claim 1, wherein the transverse member comprises a beam.

6. The battery pack according to claim 1, wherein the transverse member comprises a rear transverse beam that is situated at a rear end of the sill members.

7. The battery pack according to claim 1, the transverse front piece and/or the transverse member having a thickness extending in the length direction L and having an inward side contacting the battery cells and an outward side facing away from the battery cells, one or more passages with electrical conductors extending through the transverse front piece and/or the transverse member, from the inward side to the outward side.

8. An electric vehicle comprising the battery pack according to claim 1.

9. A method of forming a battery pack for use in an electric vehicle, comprising:

forming two or more rows of rectangular battery cells, mutually abutting in a length direction L, contacting front and rear cells with transverse members extending in a width direction W, and exerting a compressive force on the transverse members of between 20 and 200 kN/m2, thereby creating a compressed state of the battery cells, and interconnecting, in the compressed state of the battery cells, the transverse members by two substantially parallel sill members, extending in the length direction L, by attaching end sections of the sill members to the transverse members while maintaining the compressive force, wherein a transverse front piece of the transverse members comprises a transverse part having a height H substantially corresponding with the height of the battery cells, and a shelf part extending in the length direction L, away from the cells, in an upper plane at or near an upper plane defined by top sides of the battery cells, and wherein a front frame part is connected to the shelf part via a plate that is superposed on the shelf part and extending beyond the shelf part in the length direction L over the battery cells.

10. The method according to claim 9, wherein a foot accommodation member and/or a transverse beam extending in the width direction W, is/are placed between a forward group and a rearward group of cells and is/are placed with the cells between the sill members.

11. The method according to claim 9, further comprising placing a compression member between two or more battery cells that are adjacent in the length direction L.

12. A battery pack for use in an electric vehicle, the battery pack comprising:

two longitudinal sill members extending in a length direction L, interconnected at a front side by a transverse front piece and at a distance from the transverse front piece by a transverse member, the transverse front piece and the transverse member extending in a width direction W, a number of rectangular battery cells being placed between the sill members, the transverse front piece and the transverse member, the cells being mutually adjacent in the length direction L, the transverse front piece and the transverse member exerting a compressive force of between 20 and 200 kN/m2 on the cells in the length direction, two or more rows of battery cells being placed side by side in the width direction W, wherein the transverse front piece comprises a transverse part having a height H substantially corresponding with the height of the battery cells, and a shelf part extending in the length direction L, away from the cells, in an upper plane at or near an upper plane defined by the top sides of the battery cells, and wherein a front frame part is connected to the shelf part via a plate that is superposed on the shelf part and extends beyond the shelf part in the length direction L over the battery cells.

* * * * *